United States Patent [19]

Barker

[11] Patent Number: 5,517,309
[45] Date of Patent: May 14, 1996

[54] TOOL FOR ANALYZING A POLARIZATION STATE OF A LIGHT BEAM

[76] Inventor: David D. Barker, 360 S. Fairview, Goleta, Calif. 93117

[21] Appl. No.: 58,315

[22] Filed: May 3, 1993

[51] Int. Cl.⁶ .................................................. G01J 4/00
[52] U.S. Cl. ........................ 356/364; 356/366; 356/367
[58] Field of Search ............................. 345/31; 356/364, 356/366, 367

[56] References Cited

U.S. PATENT DOCUMENTS

| | | | |
|---|---|---|---|
| 3,580,681 | 5/1971 | Robert et al. | 356/114 |
| 4,269,511 | 5/1981 | Erwin | 356/368 |
| 4,310,247 | 1/1982 | Korth et al. | 356/365 |
| 4,516,855 | 5/1985 | Korth | 356/367 |
| 4,681,450 | 7/1987 | Azzam | 356/367 |
| 4,725,145 | 2/1988 | Azzam | 356/367 |
| 5,157,460 | 10/1992 | Hino | 356/365 |

*Primary Examiner*—Richard A. Rosenberger
*Assistant Examiner*—Robert Kim

[57] ABSTRACT

An apparatus is provided for analyzing the polarization state a light beam. A rotatable disk provides, on a surface of the disk, a visual indicator and a centrally positioned polarizer. The indicator and polarizer rotate with the disk as a single unit. A drive motor is engaged with the rotatable disk for providing motive force in rotating the disk about its central rotational axis. A signal processing circuit includes an optical detector positioned on one side of the polarizer for receiving the light beam after the light beam passes through the polarizer. The optical detector produces a detector electrical signal of an amplitude generally dependent on the instantaneous rotational position of the rotatable disk, as such position is determinant of the light attenuating power of the polarizer on the light beam. The signal drives the visual indicator to produce a visual image as the disk rotates. The image is dependent on the signal amplitude and the polarization state of the light beam, whereby the polarization state is determinable from the image. Additional components are included for determining the four Stokes polarization vectors, and differentiating between unpolarized and circularly polarized light.

11 Claims, 5 Drawing Sheets

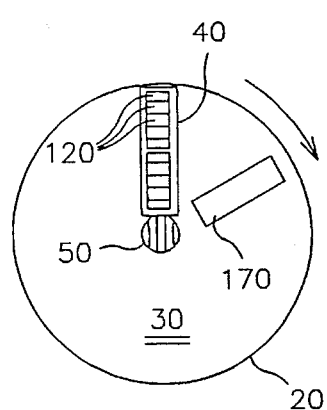
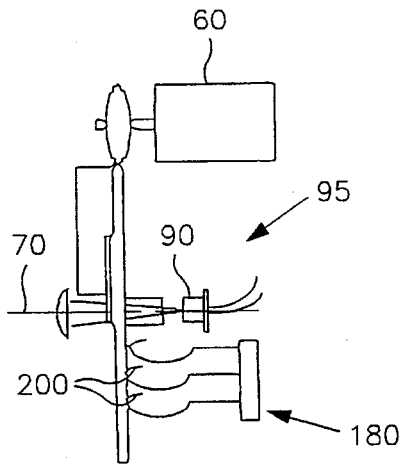
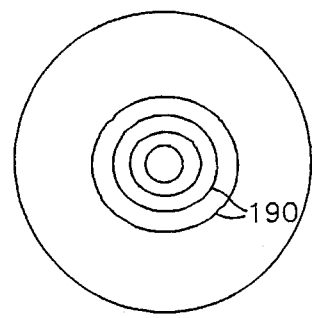
FIG. 2  FIG. 3  FIG. 4
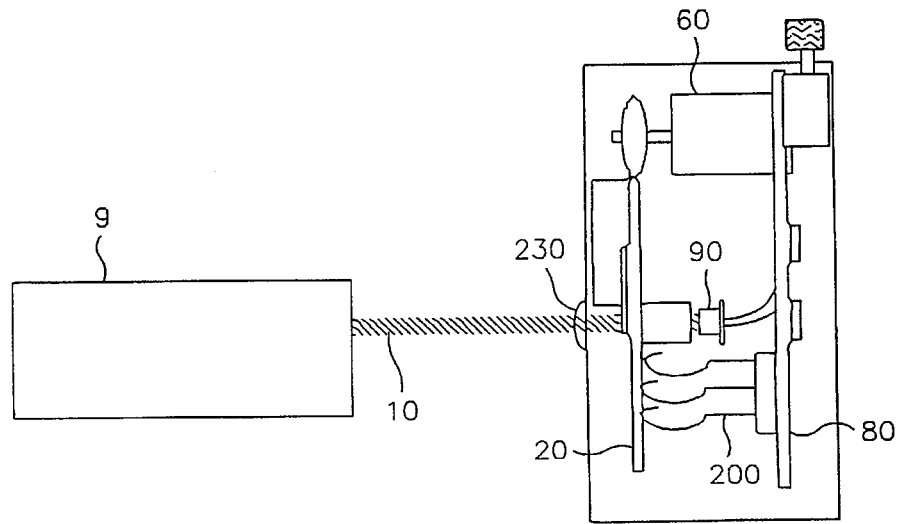
FIG. 1

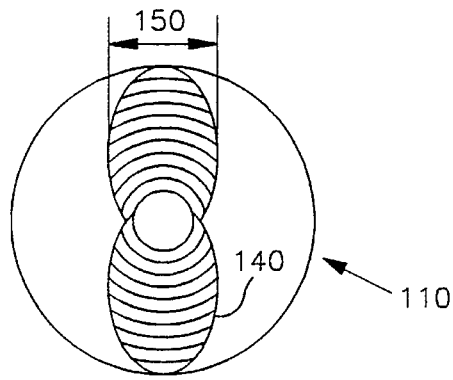
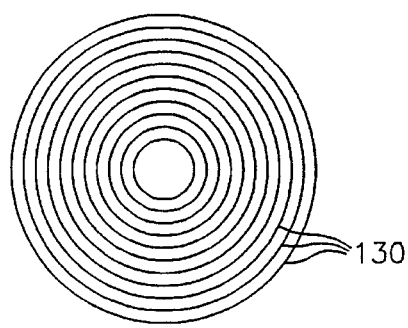
FIG. 6    FIG. 7
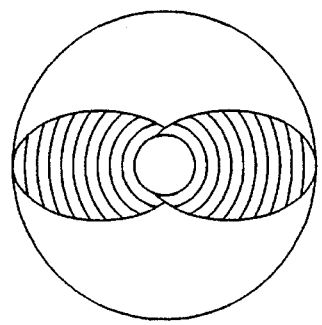
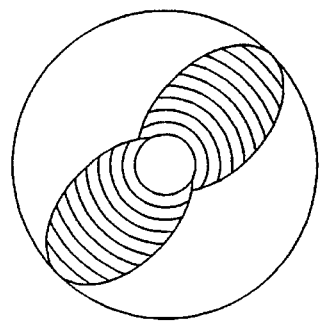
FIG. 8    FIG. 9
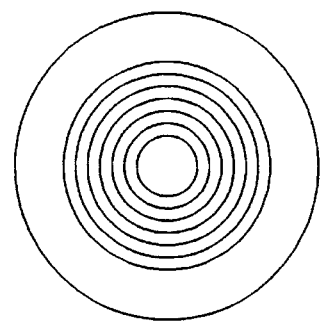
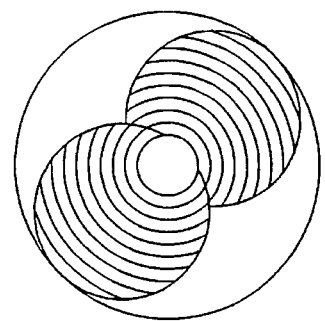
FIG. 10    FIG. 11

TOOL FOR ANALYZING A POLARIZATION STATE OF A LIGHT BEAM

FIELD OF THE INVENTION

This invention relates generally to measuring devices, and, more particularly, is directed toward a low-cost, self-contained instrument for measuring the degree and magnitude of the polarization of a light beam.

BACKGROUND OF THE INVENTION

Relatively expensive and difficult-to-use photopolarimeters exist in the prior art. For example, U.S. Pat. No. 3,580,681 to Robert et al. on Sep. 27, 1968 teaches a multi-component workbench apparatus for measuring the properties of elliptically polarized light. Another photopolarimeter device is found in U.S. Pat. No. 4,725,145 to Azzam on Jul. 21, 1987. Such a device includes multiple reflective elements in different planes and results in an output signal related to the four Stokes values of light polarization. U.S. Pat. No. 4,269,511 to Erwin on May 26, 1981 teaches another apparatus and method for measuring the magnitude of polarization of light. All such prior art devices result in an output signal or signals, some of which may vary over time or with the angle of the detector means, and all of which must be interpreted by some other means, such as a computer with a display system.

U.S. Pat. No. 4,516,855, issued to Korth on May 14, 1985, illustrates a more complete system inasmuch as the detector is taught with a color display device. However, such a color display device is expensive, as is the modified TV camera detector of such a system.

Clearly, then, there is a need for a self-contained, easy-to-use instrument for measuring the polarization properties of a light beam. Such a needed device would be inexpensive and would not require a complicated display system. Further, such a needed device would not require complex interpretation steps, nor would such a needed device require multiple detectors, reflectors, or other complex optical components. The present invention fulfills these needs and provides further related advantages.

SUMMARY OF THE INVENTION

The present invention is a tool for analyzing a light beam. A rotatable disk provides, on a surface of the disk, a visual indicator means and a centrally positioned polarizing means. The indicator means and polarizing means rotate with the disk as a single unit. A drive means is engaged with the rotatable disk for providing motive force in rotating the disk about a disk-central rotational axis. A signal processing circuit includes an optical detector means positioned on one side of the polarizing means for receiving the light beam after the light beam passes through the polarizing means. The optical detector means produces a detector electrical signal of an amplitude generally dependent on the instantaneous rotational position of the rotatable disk, as such position is determinant of the light attenuating power of the polarizing means on the light beam. The signal drives the indicator means to produce a visual image as the disk rotates. The image is dependent on the signal amplitude and the polarization state of the light beam, whereby the polarization state is determinable from the image.

The present device is a self-contained, easy-to-use instrument for measuring the polarization properties of a light beam. The present device is inexpensive and does not require a complicated or expensive auxiliary display system. The present device is portable and can be set-up for operation quickly. Further, the present device does not require complex interpretation steps, nor does it require multiple detectors, reflectors, or other complex optical components. Other features and advantages of the present invention will become apparent from the following more detailed description, taken in conjunction with the accompanying drawings, which illustrate, by way of example, the principles of the invention.

BRIEF DESCRIPTION OF THE DRAWINGS

The accompanying drawings illustrate the invention. In such drawings:

FIG. 1 is a diagram of the invention, illustrating a light source of a light beam that is focused onto a detector after passing through a polarizing means of the invention;

FIG. 2 is a front elevational view of the rotatable disk of the invention, illustrating a visual indicating means and the polarizing means of the invention;

FIG. 3 is a left-side elevational view of the invention, illustrating a detector and a commutation means of the invention;

FIG. 4 rear elevational view the rotatable disk of the invention, illustrating a number of commutation rings of the commutation means of the invention;

FIG. 6 is a front elevational view of the rotating disk of the invention, illustrating the visual image obtained when the light beam is vertically linearly polarized;

FIG. 7 is a front elevational view of the rotating disk of the invention, illustrating the visual image obtained when the light beam is unpolarized;

FIG. 8 is a front elevational view of the rotating disk of the invention, illustrating the visual image obtained when the light beam is horizontally linearly polarized;

FIG. 9 is a front elevational view of the rotating disk of the invention, illustrating the visual image obtained when the light beam is linearly polarized at 45°;

FIG. 10 is a front elevational view of the rotating disk of the invention, illustrating the visual image obtained when the light beam is circularly polarized;

FIG. 11 is a front elevational view of the rotating disk of the invention, illustrating the visual image obtained when the light beam is partially linearly polarized at 45°;

DETAILED DESCRIPTION OF THE PREFERRED EMBODIMENT

Figure 5:
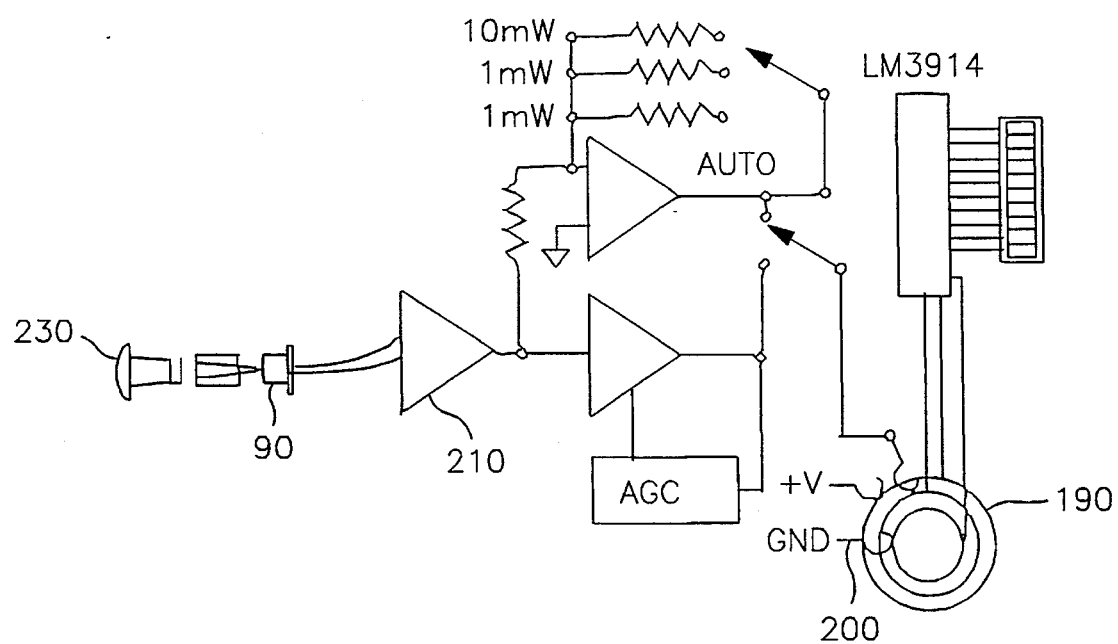
FIG. 5 is a schematic diagram of the electrical components of the invention, illustrating a gain control and signal level sensitivity selection circuit of the invention.
Figure 12:
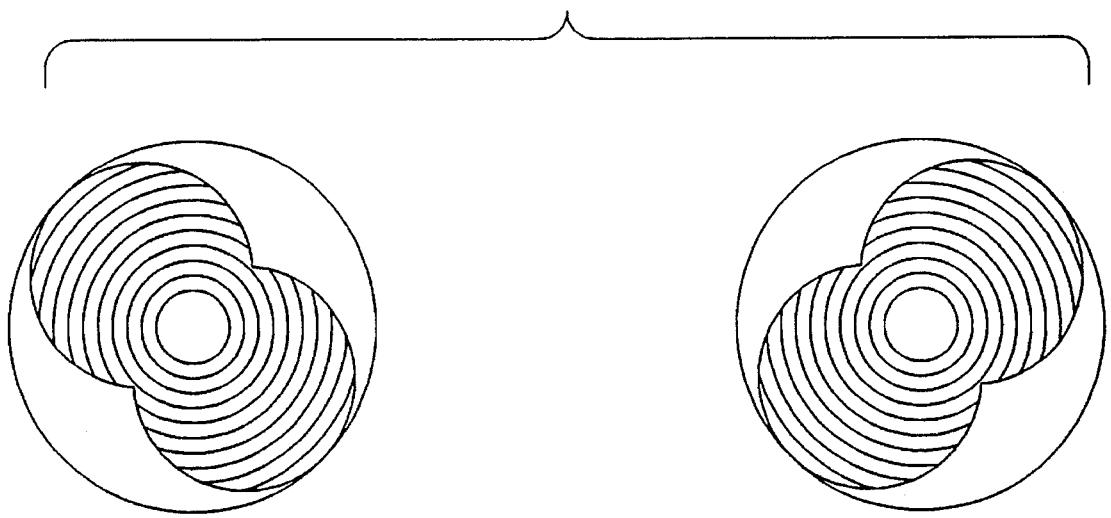
FIG. 12 is a front elevational view of the rotating disk of the invention, illustrating the mode swapping visual image obtained when the light beam is a two mode random polarized light beam.

FIG. 1 illustrates a tool for analyzing a light beam 10. A rotatable disk 20 provides, on a surface 30 of the disk 20, a visual indicator means 40 and a centrally positioned polarizing means 50. The indicator means 40 and polarizing means 50 rotate with the disk 20 as a single unit. A drive means 60 is engaged with the rotatable disk 20 for providing motive force in rotating the disk 20 about a disk-central rotational axis 70 (FIG. 3).

A signal processing circuit means 80 includes an optical detector means 90 positioned on one side 95 of the polarizing means 50 for receiving the light beam 10 after the light beam 10 passes through the polarizing means 50. A focusing lens 230 may be positioned between the light source and the polarizing means 50 such that the light beam 10 is brought to focus through the polarizing means 50 onto the optical detector means 90 (FIG. 5). The optical detector means 90 produces a detector electrical signal of an amplitude generally dependent on the instantaneous rotational position of the rotatable disk 20, as such position is determinant of the light attenuating power of the polarizing means 50 on the light beam 10 incident thereon. The signal drives the indicator means 40 to produce a visual image 110 as the disk 20 rotates (FIGS. 6–13). The image 110 is dependent on the signal amplitude and the polarization state of the light beam 10, whereby the polarization state is determinable from the image 110. The signal processing circuit means 80 may further include a power amplifier 210 for interconnecting the optical detector means 90 with a gain control and signal level sensitivity selection circuit 220 (FIG. 5).

In the preferred embodiment of the invention, the visual indicator means 40 is a linear array comprising a plurality of individual illumination sources 120, such as light emitting diode devices (FIG. 2). The linear array is radially oriented on the rotatable disk 20 such that when the light beam 10 is unpolarized or circularly polarized the image produced is a series of concentric illuminated circles 130 (FIG. 7). The number of such circles 130 is dependent upon the signal amplitude. Differentiation between unpolarized and circularly polarized light beams 10 may be accomplished by including a snap-in quarter-wave plate (not shown), particularly of the type equipped with prominent axis marks, between the light source and the detector means 90. With such a quarter-wave plate installed at the detector input port, the visual image 110 resulting from unpolarized light remains a series of concentric circles 130. By slow fingertip rotation of the quarter wave plate, circularly polarized light is at some point in the rotation of the plate converted into linearly polarized light. By noting the relative rotation of the plate axis marks and the orientation of the bowtie display pattern on the invention disk the right hand/left hand parity of the incident light beam is determined. However, if the incident light beam is random or unpolarized, rotation of the plate will result in a circular display on the invention disk at all orientations of the plate. Thus the linear polarization axis of the incident beam is determined directly and right/left circular (elliptical) polarization or random polarization is determined with the snap in quarter wave plate attachment.

Figure 13:
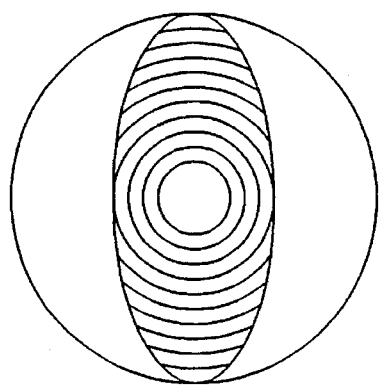
FIG. 13 is a front elevational view of the rotating disk of the invention, illustrating the visual image obtained when the light beam is elliptically polarized.

When the light beam 10 is linearly polarized, the image produced is of a colinear two-lobe display having a major axis oriented in the plane of polarization of the light beam 10 (FIGS. 6 and 8). The widths 150 of the lobes of such a colinear two-lobe display 140 indicate the degree of polarization of the light beam 10. When the light beam is elliptically polarized, the image produced takes on an elliptical shape 160 having a major axis oriented in the plane of polarization of the light beam 10, and a width indicative of the character of polarization of the light beam 10 (FIG. 13).

Further, the preferred mode of the invention includes a driver circuit 170 positioned on the rotatable disk 20 for energizing the visual indicating means 40. A commutation means 180 is included for electrically interconnecting the relevant parts of the circuit means 80 with the driver circuit 170 (FIGS. 1,3, 5, 14). Such a commutation means 180 may include a series of commutation conductor rings 190 arranged concentrically with the rotational axis 70 of the disk 20. The signal processing circuit means 80 includes electrical brush means 200 for providing electrical contact with the conductor rings 190 on the disk 20.

Figure 14:
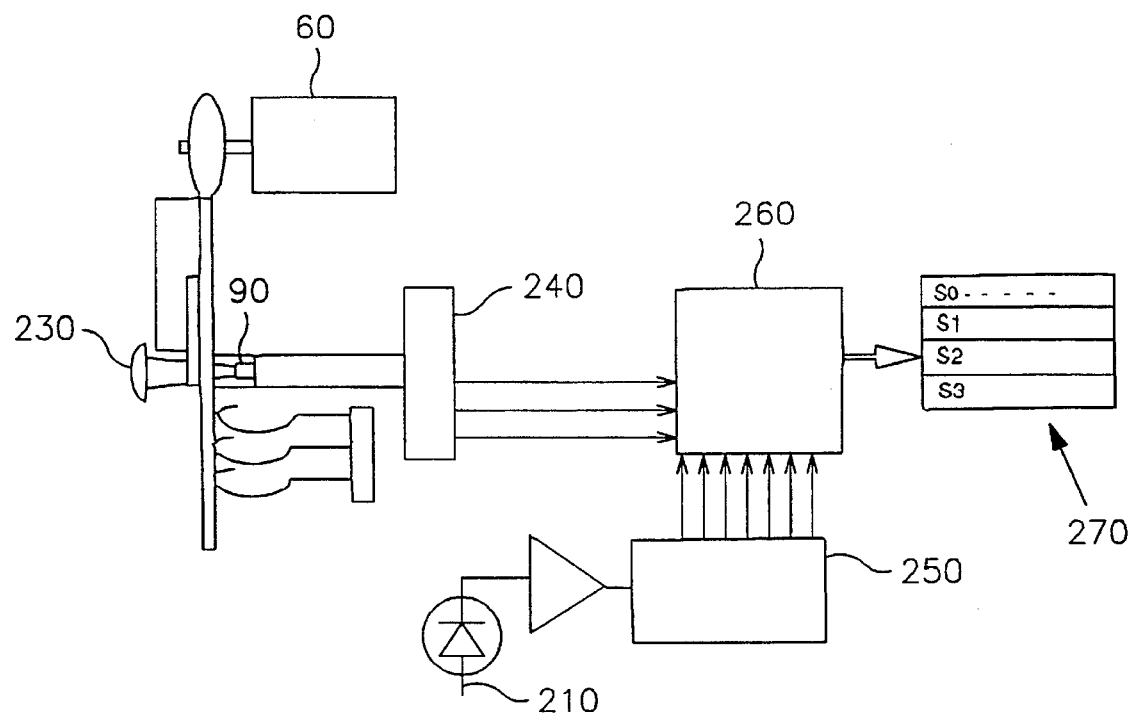
FIG. 14 is a schematic diagram of the electrical components of the invention, illustrating an embodiment that includes an analog to digital signal converter, a digital processor, and a digital display means.

In another embodiment of the invention, the visual indicator means 40 is a color display means, and further includes in the signal processing circuit a detector signal amplifier and a microprocessor for modulating color signals for driving the color display means such that the intensity of the light beam is further indicated by a color image display (FIG. 14). Such a color display means may be an array of colored light emitting diodes (FIG. 5), or a plurality of liquid crystal display devices (not shown).

Another embodiment of the invention further includes a rotary encoder 240 fixed to rotate with the rotatable disk 20, an analog to digital signal converter means 250, and a digital processing means 260 having a digital display means 270. The detector electrical signal and related disk angle are sampled, converted to a digital electrical signal, and stored for reference in order to calculate and display additional desired information, including the four Stokes polarization vectors for a Poncaire Sphere, that is, $S_0$, $S_1$, $S_2$, and $S_3$. Such vectors are found, for example, by sampling and subtracting the 0° and 90° components and the +45° minus the −45° components, and then normalizing with the intensity component integrated over a full revolution of the disk 20.

The supplement use of the quarter wave plate attachment can be used to infer the circular polarization S3 vector.

While the invention has been described with reference to a preferred embodiment, it is to be clearly understood by those skilled in the art that the invention is not limited thereto. Rather, the scope of the invention is to be interpreted only in conjunction with the appended claims.

What is claimed is:

1. A tool for analyzing a light beam comprising:

a rotatable disk providing, on a surface of the disk, a visual indicator means, and a centrally positioned polarizing means, the indicator means and polarizing means rotating with the disk as a single unit;

drive means engaged with the rotatable disk for providing motive force in rotating the disk about a disk-central rotational axis; and signal processing circuit means including optical detector means positioned on one side of the polarizing means, for receiving the light beam after the light beam passes through the polarizing means, and for therefrom producing a detector electrical signal of an amplitude generally dependent on the instantaneous rotational position of the rotatable disk, as such position is determinant of the light attenuating power of the polarizer on the light beam incident thereon, said signal driving the indicator means to produce a visual image as the disk rotates, the image being dependent on the signal amplitude and the polarization state of the light beam whereby the polarization state is determinable from the image.

2. The tool of claim 1 wherein the visual indication means is a liner array comprising a plurality of individual sources of illumination, the linear array being radially oriented on the rotatable disk, such that when the light beam is unpolarized, randomly polarized, or is circularly polarized the image produced is of a series of concentric illuminated circles, the number of circles depending on the signal amplitude; when the light beam is linearly polarized the image produced is of a colinear two lobe display having a major axis oriented in the plane of polarization of the light beam, the width of the lobes indicating the degree of polarization; and when the light beam is elliptically polarized, the image produced takes on an elliptical shape having a major axis oriented in the plane of polarization of the light beam, and a width indicative of the character of polarization of the light beam, the tool further including a quarter wave plate, such that manual placement of the plate on the detector and with manual rotation thereof relative to the axis of the light beam, circular versus unpolarized light and right hand/left hand parity of circular polarized light is differentiable by noting the dynamic changes of the display pattern and the relative rotational position of the plate.

3. The tool of claim 2 wherein each of the individual sources of illumination is a light emitting diode device.

4. The tool of claim 1 wherein the rotatable disk includes a driver circuit positioned on the rotatable disk, for energizing the visual indicating means, and a commutation means for electrically interconnecting the relevant parts of the circuit means with the driver circuit.

5. The tool of claim 4 wherein the commutation means includes a series of commutation conductor rings arranged concentrically with the axis of rotation, the signal processing circuit means including electrical brush means for providing electrical contact with the conductor rings.

6. The tool of claim 1 wherein the signal processing circuit means includes a power amplifier for interconnecting the optical detector means with a gain control and signal level sensitivity selection circuit.

7. The tool of claim 1 further including a focusing lens mounted onto the rotational disk such that the light beam is brought to focus through the polarizing means onto the optical detector.

8. The tool of claim 1 wherein the visual indicator means is a color display means, and further including in the signal processing circuit, a detector signal amplifier and a microprocessor for modulating color signals for driving the color display means such that the intensity of the light beam is further indicated by a color image display.

9. The tool of claim 1 wherein the visual indicating means is an array of colored light emitting diodes.

10. The tool of claim 1 wherein the visual indicating means is a plurality of liquid crystal display devices.

11. The tool of claim 1 further including a rotary encoder rotationally fixed to rotate with the rotatable disk, an analog to digital signal converter means, and a digital processing means having a digital display means, wherein the detector electrical signal and related disk angle are sampled, converted to a digital electrical signal, and stored for reference in order to calculate and display desired information including the four Stokes polarization vectors.

* * * * *